United States Patent Office 3,305,372
Patented Feb. 21, 1967

3,305,372
PRODUCTION OF REFRACTORY BODIES
Kenneth M. Taylor, Lewiston, N.Y., assignor to The Carborundum Company, Niagara Falls, N.Y., a corporation of Delaware
No Drawing. Filed Sept. 1, 1964, Ser. No. 393,765
6 Claims. (Cl. 106—55)

The invention of the present application relates to refractory bodies and is particularly concerned with refractory bodies which contain substantial amounts of silicon nitride and/or silicon oxynitride and with novel processes for producing such bodies.

Silicon nitride and silicon oxynitride have hitherto been recognized as useful refractory materials both as such and as binders, either alone or in admixture, for silicon carbide in forming refractory bodies.

It is an object of the present invention to provide a novel process for producing refractory bodies which contain substantial amounts of silicon nitride and/or silicon oxynitride.

Another object of the invention is to provide a process of the character described which is not critical with respect to the atmosphere in which the refractory bodies are fired.

Still another object of the invention is to provide a process of the character described which does not require the use of elemental silicon.

A further object of the invention is to provide a process of the character described in which the silicon nitride and/or silicon oxynitride is formed from a silicious material other than silicon.

Another object of the invention is to provide a process of the character described in which silicon nitride and/or silicon oxynitride is formed from silicon carbide.

A further object of the invention is to provide a novel process for producing refractory bodies in which silicon nitride and/or silicon oxynitride serves as a bond for granules of a refractory material.

A further object of the invention is to provide a novel process for producing refractory bodies which comprise granular silicon carbide in a bond containing silicon nitride and/or silicon oxynitride.

The foregoing objects are achieved according to the present invention by replacing the elemental silicon previously used in forming refractory bodies of the type described with a mixture of a reducible silicious material, such, for example, as silica or a clay, and, as a reducing agent, finely divided silicon carbide. Broadly, the process involves the heating in the presence of nitrogen of shaped bodies which comprise finely divided silicon carbide, and a reducible silicious material. The silica of the silicious material is reduced by the finely divided silicon carbide and reaction of nitrogen with the reaction product of the silicon carbide and silicious material results in the formation of silicon nitride and/or silicon oxynitride. Where a silicious material such as a clay is used in carrying out the process the final product may, of course, also comprise aluminum nitride and other metal compounds derived from the clay. The products resulting from the process, whether carried out with silica or a clay, are highly refractory articles with an excellent resistance to corrosion by molten metal salts.

The present novel process is a desirable commercial method for producing refractory and corrosion-resistant articles which consist essentially of silicon nitride and/or silicon oxynitride with or without granules of other refractory material. By the present process expensive elemental silicon is not necessary and the electrical properties of the resulting articles are not affected by unreacted elemental silicon. Articles of excellent strength with outstanding heat, corrosion, and wear resistance are obtained by the practice of the process.

As indicated above, the raw mixes which are used in carrying out the present novel process comprise finely divided silicon carbide together with silica or a clay and may, where desired, also contain coarser particles of silicon carbide and/or granules of other refractory materials. In some cases catalysts of known usefulness in the formation of silicon nitride by the reaction of nitrogen with elemental silicon may be included. If desired, carbon may be added as a partial replacement of silicon carbide for reduction of the silicious material. It should be noted, however, that catalysts may in some cases be ineffective or of doubtful value and that articles formed from mixes that include carbon may be of lower strength than those formed from mixes in which there is no carbon.

The following examples set forth specific mixes and procedures employed in carrying out the present invention. In Examples 1–4, inclusive, the object is to obtain bodies comprising silicon nitride and/or silicon oxynitride in major amount.

Example 1

A mix consisting of the following:

| | Percent |
|---|---|
| Silicon carbide (200 mesh and finer) | 50 |
| Tennessee ball clay (325 mesh and finer) | 50 | was blended with enough water to obtain a mass suitable for pressing. Bars ½" x ¼" x 3" were molded from the mix at a pressure of about 422 kg./cm.$^2$ and dried at 125° C. before they were nitrided. The nitriding of the bars was carried out in an electrically heated muffle. The temperature was raised approximately 300° C. per hour and a maximum temperature of about 1425° C. was attained with the bars being held at the maximum temperature for about 16 hours. While the bars were heated, nitrogen was passed through the muffle at such a rate as to change the gas in the muffle about 50 times per hour.

Bars prepared as above described had a density of 2.02 g./cm.$^3$ and contained essentially of silicon nitride, silicon oxynitride, and aluminum nitride in addition to silicon carbide. The latter was present in quite small amounts as shown by an analysis for carbon. The nitrogen content was 29.1%.

The modulus of rupture of bars prepared as described above was determined at room temperature with the bars flat and using a 2½ inch span with three point loading. The average figure was approximately 576 kg./cm.$^2$. Other bars prepared as described above when subjected to the standard corrosion test in which they are immersed in molten cryolite at 1000° C. for two hours, showed only about a 3% loss of volume.

Example 2

A mix consisting of the following:

| | Percent |
|---|---|
| Silicon carbide (200 mesh and finer) | 50 |
| Kaolin (325 mesh and finer) | 50 | was blended with water to form a mass that could be pressed into ½" x ¼" x 3" bars. Bars were pressed, nitrided and tested in the same manner as described above. It was found that the modulus of rupture was lower, about 323 kg./cm.², than the bars in Example 1 with the bars containing less silicon oxynitride and silicon carbide. They were also somewhat less resistant to corrosion by molten cryolite.

*Example 3*

A mix consisting of the following:

| | Percent |
|---|---|
| Silicon carbide (200 mesh and finer) | 45 |
| Tennessee ball clay (325 mesh and finer) | 55 | was blended with water and molded into ½" x ¼" x 3" bars by the above described procedure. These bars, after nitriding using the same procedure as in Example 1, contained essentially silicon nitride, silicon oxynitride, aluminum nitride and a little more silicon carbide than the bars of Example 1. The bars were stronger than those of either Example 1 or Example 2 and showed a somewhat greater resistance to corrosion in molten cryolite than the bars of Example 2.

Virtually complete conversion of the silicon content of a mix to silicon nitride is shown in the following example.

*Example 4*

A mix consisting of:

| | Percent |
|---|---|
| Silicon carbide (325 mesh and finer) | 47 |
| Tennessee ball clay (325 mesh and finer) | 53 | was blended with sufficient water to mold ½" x ¼" x 3" bars by the above described procedure. The damp bars were dried at 125° C. and nitrided as described in Example 1 at a maximum temperature of about 1425° C. for about 16 hours. Nitriding was then continued in the same apparatus for another 16 hours at a temperature of about 1450° C.

The nitrided bars had a density of 1.91 g./cm.³ and contained essentially silicon nitride and aluminum nitride. The low carbon content, 0.13%, and high nitrogen content, 34.9%, indicate that the silicon carbide has been substantially all converted to silicon nitride and that the available silicon in the clay has also been so converted.

Modulus of rupture tests on the nitrided bars showed a strength of about 359 kg./cm.² and the bars were found to have a loss of less than 1% by volume when immersed in cryolite for two hours at 1000° C.

It will be seen from the foregoing examples that nitrided articles formed from mixes containing silicon carbide and clay in proportions of the order of 50% are strong and have relatively high resistance to molten cryolite. The articles consist essentially of silicon nitride and aluminum nitride and may contain small amounts of silicon oxynitride and residual silicon carbide as well as impurities from the raw materials. Where the raw batch mixes contain up to 60%–65% of clay the strength of nitrided articles is quite high, the average modulus of rupture as determined on ½" x ¼" x 3" bars being 815–935 kg./cm.². X-ray diffraction examination of such bars, however, has shown the presence of some mullite (3 $Al_2O_3 \cdot 2SiO_2$) and a relatively large silicon carbide content. This may result from an excessive sintering together of the bars thus preventing or hindering access of the nitrogen atmosphere to the silicon carbide.

In contrast to the essentially nitride bodies obtained in Examples 1–4, inclusive, where residual silicon carbide may be regarded as an impurity, when smaller amounts of clay are used as the reducible silicious material the bodies obtained by nitriding contain silicon nitride and/or silicon oxynitride along with aluminum nitride as a bond for the relatively large amount of unreacted silicon carbide. The latter mentioned bodies are characterized by good strength and excellent resistance to corrosion by molten cryolite although the nitrogen content is much lower than in the articles of Examples 1–4, inclusive. The production of such articles is illustrated in Examples 5–7, inclusive.

*Example 5*

A mix consisting of the following:

| | Percent |
|---|---|
| Silicon carbide (through 10 mesh on 70 mesh) | 60 |
| Silicon carbide (200 mesh and finer) | 25 |
| Tennessee ball clay (325 mesh and finer) | 15 | was blended with water to obtain a mass suitable for pressing. Test bars ½" x ¼" x 3" were molded from the damp mix and dried in the same way as described in Example 1. They were then nitrided in the same manner as there described but using a maximum temperature of 1450° C. for 6 hours.

The refractory bars obtained contained considerable excess silicon carbide and had a density of 2.40 g./cm.³. The bond for the silicon carbide particles comprised essentially silicon nitride, silicon oxynitride, and aluminum nitride. The nitrogen content was 7.2%. The average modulus of rupture of the bars was about 218 kg./cm.² and no corrosion of the bars by molten cryolite at 1000° C. for 2 hours was detectable.

*Example 6*

A mix consisting of the following:

| | Percent |
|---|---|
| Silicon carbide (through 10 mesh on 70 mesh) | 65 |
| Silicon carbide (200 mesh and finer) | 25 |
| Bentonite (325 mesh and finer) | 10 | was blended with water to obtain a mass suitable for pressing. Test bars ½" x ¼" x 3" were molded from the mix at about 422 kg./cm.² and after drying at 125° C. were nitrided in the manner described in Example 1 for 16 hours at a maximum temperature of about 1400° C.

The test bars after nitriding were examined and tested as described in Example 1 and it was found that they had a nitrogen content of 66%, a density of 2.6 g./cm.³, and an average modulus of rupture of about 239 kg./cm.². They were substantially unaffected by immersion in molten cryolite at 1000° C. for 2 hours.

*Example 7*

A mix consisting of the following:

| | Percent |
|---|---|
| Silicon carbide (through 10 mesh on 70 mesh) | 72 |
| Silicon carbide (200 mesh and finer) | 25 |
| Bentonite (325 mesh and finer) | 3 | was made into a moldable mass with water and formed into bars ½" x ¼" x 3". These were dried at 125° C. and nitrided in the same manner as the previously described examples with the maximum temperature being about 1400° C. and the time at that temperature being 16 hours.

The resultant refractory bars were tested in the manner heretofore described and found to have a density of 2.51 g./cm.³ and a nitrogen content of 6.9%. The bars were not attacked by molten cryolite during immersion for 2 hours at 1000° C. and had an average modulus of rupture of about 302 kg./cm.². X-ray examination showed the presence of silicon nitride.

As previously set forth, the reducible silicious material used for reaction with finely divided silicon carbide to form the refractory bodies of the present invention may also be silica. Because of density changes resulting from changes in allotropic form of the silica it is not usually practical to employ mixes containing silica, as such, in amounts exceeding about 20%. However, in lower proportions bodies formed from mixes consisting essentially of silicon carbide, silica and a temporary binder may, as shown by the following examples, be nitrided to produce excellent refractory bodies.

Example 8

A mix consisting of the following:

| | Percent |
|---|---|
| Silicon carbide (through 10 mesh on 70 mesh) | 68 |
| Silicon carbide (200 mesh and finer) | 25 |
| Silica (200 mesh and finer) | 5 |
| Dextrine powder | 2 | was blended with sufficient water to produce a mass suitable for pressing, the dextrine serving as a temporary bond. Bars ½″ x ¼″ x 3″ were molded from the mass under a pressure of about 422 kg./cm.² After drying the bars at about 125° C. they were nitrided in the same manner as the bars described in Example 1 except that the maximum temperature was about 1450° C. instead of 1425° C.

The resultant nitrided bars had a density of 2.42 g./cm.³ and contained 5.8% nitrogen. X-ray examination showed the presence of silicon nitride in the bars in addition to the large amount of silicon carbide. The bars had a modulus of rupture, determined as described above, of about 309 kg./cm.² and showed no loss of volume when immersed in molten cryolite at 1000° C. for 2 hours.

Example 9

A mix consisting of the following:

| | Percent |
|---|---|
| Silicon carbide (through 10 mesh on 70 mesh) | 58 |
| Silicon carbide (200 mesh and finer) | 25 |
| Silica (200 mesh and finer) | 15 |
| Dextrine powder | 2 | was blended with water to obtain a pressable mass and ½″ x ¼″ x 3″ bars were pressed and nitrided under the same conditions and in the same manner as in Example 8. The resulting nitrided bars had a density of 2.28 g./cm.³ and a nitrogen content of 7.3%. X-ray examination showed that silicon oxynitride as well as silicon nitride was present therein along with silicon carbide.

When tested in the manner described in Example 1 the nitrided bars of this example had a modulus of rupture of about 204 kg./cm.² and showed no attack by molten cryolite.

Example 10

A mix consisting of the following:

| | Percent |
|---|---|
| Silicon carbide (through 10 mesh on 70 mesh) | 62 |
| Silicon carbide (200 mesh and finer) | 25 |
| Silica (200 mesh and finer) | 10 |
| Dextrine powder | 2 |
| Calcium fluoride | 1 | was blended with water to obtain a plastic mass. The calcium fluoride was added as it is known to have a catalytic effect in forming silicon nitride by the reaction of elemental silicon with nitrogen at elevated temperatures. Bars measuring ½″ x ¼″ x 3″ were pressed from the plastic mass and nitrided in the manner described in Example 1 except that the maximum nitriding temperature was about 1400° C. and the period of time the bars were at that temperature was about 12 hours.

After nitriding, the bars were examined and tested as described in Example 1 and found to have a nitrogen content of 8.0%, a density of 2.32 g./cm.³, and a modulus of rupture of 232 kg./cm.². They contained, in addition to silicon carbide, silicon oxynitride as well as silicon nitride and showed no attack when immersed in molten cryolite for 2 hours.

Bars prepared substantially identically with those of Example 10 but including no catalyst were found to have a lower nitrogen content (5.7%) and a lower modulus of rupture (about 218 kg./cm.²).

In examples 8, 9, and 10 the silicon carbide employed was a mixture of relatively coarse and finer particles some being very fine. With such a mixture the relatively coarse carbide does not react to any substantial extent under the conditions present, the very fine particles of silicon carbide being the reactive portion. Other factors being the same, the finer the carbide the more reactive it is. Consequently, while a substantial amount of very fine silicon carbide will normally be present in mixes for producing refractory bodies according to the present invention to ensure adequate bonding of the nitrided products, it is possible to use greater amounts of coarser material as desired for specific purposes. However, as is seen in some of the foregoing examples, the presence of coarse silicon carbide is not necessary.

It is, of course, also possible by the general invention herein to produce bodies in which a matrix which consists essentially of silicon nitride and/or silicon oxynitride serves as a bond for other granular refractory materials. The matrix or bond may, depending on the mix used, also contain aluminum nitride and/or residual silicon carbide, together with impurities. The production of such an article is described in the following example.

Example 11

The following mix:

| | Percent |
|---|---|
| Fused aluminum oxide (14 mesh and finer) | 65 |
| Silicon carbide (325 mesh and finer) | 20 |
| Tennessee ball clay (325 mesh and finer) | 15 | was mixed with a small amount of water and pressed into ½″ x ¼″ x 3″ bars. These, after drying were nitrided as described in Example 1 at a maximum temperature of about 1450° C. for 12 hours. The nitrided bars contained about 9% nitrogen and had a modulus of rupture of about 64 kg./cm.². The bond for the granular alumina particles contained essentially silicon nitride, aluminum nitride, and silicon carbide.

It is evident from the foregoing that the bonds in nitrided articles according to the present invention vary rather widely in accordance with a number of factors although such bonds are essentially and predominantly silicon nitride and/or silicon oxynitride. When silica is used with silicon carbide as the sole reducible silicious material the bond may also contain minor amounts of unreacted silica and other incidental impurities. In an article formed from a mix using clay, the bond will normally also include in addition to silicon nitride and/or silicon oxynitride, minor amounts of aluminum nitride and nitrides of other nitride-forming metals present in the mix as well as incidental impurities.

The exact composition of the bonds in nitrided bodies or articles according to the invention is not only variable but also substantially impossible to define accurately. Quantitative analysis does not provide information as to the compounds present and X-ray diffraction, of course, is not reliable for the accurate determination of small percentages of compounds. Basically, the formation of silicon nitride from silicon carbide, silica, and nitrogen at elevated temperatures may be represented by the equation:

$$SiO_2 + 2SiC + 2N_2 \rightarrow Si_3N_4 + 2CO$$

A similar reaction takes place in the production of silicon oxynitride. The latter compound is described by W. D. Forgeng and B. F. Decker in "Nitrides of Silicon," Trans. Met. Soc. A.I.M.E. 212 (3), 343–348 (1958). In many instances when carrying out the present novel process at least a substantial amount of the bond or binder of the nitrided article is found to have the X-ray powder diffraction pattern set forth in the periodical article referred to above as characteristic of silicon oxynitride  The important difference in the reaction by which the oxynitride is produced is apparently the production of two moles of the oxynitride for each two moles of reacting silicon carbide and for each two moles of silica used. In instances where clays are used as a source of silica in carrying out the process, it appears that the silicates of the clay are reduced by the silicon carbide in somewhat analogous reactions so that silicon nitride and/or oxynitride and other nitrides, such as those of aluminum and titanium, are formed. These other nitrides, except for aluminum nitride, are always present in very minor amounts and are of no particular importance so far as the invention is concerned. Aluminum nitride, when present, is considered to be a desirable constituent of the refractory articles for many uses as it has good resistance to fused acid salts, molten metals, and numerous slags. There is evidence tending to show that the aluminum nitride, at least in part occurs in solid solution.

The courses of the reactions involved in any particular case may be controlled to some extent by the proportion of very fine silicon carbide present. Also effective in controlling the courses of such reactions is the amount of reducible silicious material present. Since, however, an excess of nitrogen is always present during nitriding there is a tendency when excess silicon carbide is present to form silicon nitride in the bond rather than the oxynitride. Nevertheless, in many cases the bodies being siliconized are of such size and/or shape as to hinder access of nitrogen to the interior thereof with the result that substantial oxynitride is present there.

It will be evident from the foregoing that the proportions of ingredients in the mixes used to form refractory articles in accordance with the present invention may vary rather widely. They should be such that the $SiO_2$ content of the reducible silicious material constitutes from about 1% to about 30% of the mix. If the silicious material contains alumina the $Al_2O_3$ content of the mix may run as high as about 20%–25%. The silicon carbide is frequently desired as a bonded material as well as a reactant for the bond. In such cases it may comprise as much as 95%–97% of the mix. However, when it is to be used only in bond formation the silicon carbide content may be as low as 15%–20%. Tennessee ball clays contain about 52% $SiO_2$ and about 31% $Al_2O_3$; analyses of bentonites show about 62% $SiO_2$ and about 18% $Al_2O_3$; and kaolin contains about 47% $SiO_2$ and about 40% $Al_2O_3$. Accordingly, in the specific examples set forth above the $SiO_2$ content of the mixes varies from a low of less than 2% in Example 7 to a high of almost 29% in Example 3. The $Al_2O_3$ content in those mixes using clays as the reducible silicious materials ranged from about 0.5% to over 65%. In the latter, however, granular alumina was added in excess to give a bonded alumina body. If desired, mixtures of silica and alumina (bauxite, for example), clay and alumina, or silica, clay, and alumina may be used as raw batches in forming refractory bodies in accordance with the present invention. As pointed out above, however, a crystalline silica content of more than about 20% may present difficulties as a result of density changes during heating.

As is pointed out above, a catalyst may be used in the mix if desired. U.S. Patent No. 2,618,565, granted November 18, 1952 to K. C. Nicholson, discloses a number of catalysts useful for the production of silicon nitride. Any of the catalysts there mentioned may be used in the proportions set forth therein and other suitable catalysts can be used in useful amounts.

Although, as previously mentioned, finely divided carbon may be used in the mix as a reducing agent in partial substitution for fine silicon carbide, its use is not preferred since it appears that the strength of the resulting articles is lowered. This is true even when the carbon comprises only 5% of the mix and 6% of the total SiC content. On the other hand, when a temporary bond, for example dextrine, is used in making a moldable mix in accordance with the invention, a small amount of carbon is left in the molded article. Since a temporary bond is seldom required in excess of about 3%–5%, the maximum carbon content of mixes using temporary binders is ordinarily less than 1% and this is not believed to be significant.

As would be expected the nitriding step is one in which time and temperature are inversely related. Thus, other factors being the same, equivalent results may be obtained by nitriding at a high temperature for a short time or by nitriding at a lower temperature for a longer time. It has been found, however, that a minimum temperature of about 1300° C.–1350° C. is essential to satisfactory nitriding and a temperature in the range from about 1400° C.–1500° C. is usually preferred. But the minimum satisfactory nitriding time at a chosen temperature is not a constant since the speed of nitriding is also greatly influenced by the size and thickness or cross-section of the articles being nitrided. Accordingly, in many instances relatively thick articles will show a much higher nitrogen content in the outer portions thereof than in the inner ones irrespective of the temperature employed or the time. A maximum nitriding temperature of about 1700° C. is indicated because of the tendency of silicon nitride to decompose above that temperature.

The present novel process is of particular interest because of the highly useful properties found in nitrided articles made in accordance therewith. Substantially all such articles have a good resistance to molten cryolite and many are virtually unaffected thereby. At the same time all of such articles are useful refractories and many have relatively high strength. It has been found that the strength of such articles is in some cases greatly increased by repeated heating and cooling cycles. Thus the article becomes stronger in use instead of weaker. For example, a refractory bar made in substantial accordance with Example 5 but nitrided for a longer period, when subjected thirty times to heating to about 1400° C. followed by cooling to room temperature, was found to have gained more than 80% in modulus of rupture at room temperature. The tests showed a strength of 6700 p.s.i. after the thermal cycling as compared to a strength of 3600 p.s.i. before thermal cycling. Such results are indicative of very good resistance to thermal shock.

As is indicated in the foregoing description, many variations from and modifications of the procedures set forth in the several examples are possible. Thus, for example, mixes containing along with silicon carbide both silica and clay or silica and alumina may be used; nitriding catalysts may be employed; the refractory articles may be of any convenient size, may be formed into any desired shape and may be shaped by pressing, tamping, extruding, or any other desired procedure. It will also be understood that the nitriding atmosphere may be pure nitrogen or impure nitrogen such as air enriched with nitrogen or ammonia.

The present invention is of particular interest because of the desirable characteristics of articles made thereby. As pointed out above, refractory articles according to the present invention have good to excellent resistance to molten cryolite thus making them useful in aluminum reduction cells. Further, they are quite resistant to attack by many other chemicals, to oxidation, and to spalling. Consequently, articles such, for example, as chambers and chamber linings, muffles, tile, kiln furniture, crucibles, and the like may be conveniently and successfully produced by the process of the invention. Since the bodies produced by the process are very hard, they are also suited for use as thread guides, blasting nozzles and the like. The invention is also important because of the fact that by eliminating the use of elemental silicon in forming bodies containing silicon nitride and/or silicon oxynitride, very great savings are obtained.

In the present application, except as otherwise indicated, percentages specified are percentages by weight and mesh sizes are determined by U.S. standard sieves.

I claim:
1. A process for producing refractory nitride-contain- ing articles which comprises forming a mix containing from about 15 percent to about 97 percent silicon carbide, at least a portion of which is very finely divided, and a finely divided silicious material selected from the group consisting of silica and clays, said mix having a silica content of about 1 percent to about 30 percent and containing less than about 1 percent carbon forming said mix in a desired shape, and heating said shaped mix at a temperature in the range from about 1300° C. to about 1700° C. in a nitrogenous atmosphere for such a period of time as to produce substantial formation of at least one nitride selected from the group consisting of silicon nitride and silicon oxynitride.

2. A process as set forth in claim 1 in which a temperature in the range from about 1400° C. to about 1500° C. is employed.

3. A process as set forth in claim 1 in which said silicious material is silica.

4. A process as set forth in claim 1 in which said silicious material is a clay.

5. A process as set forth in claim 1 in which a substantial amount of relatively coarse silicon carbide is used in said mix.

6. A process as set forth in claim 1 in which said silicious material is a finely divided clay and substantially all the silicon carbide in said mix is finely divided and in which said clay and silicon carbide are employed in proportions which, under the reaction conditions, produce bodies consisting essentially of a material selected from the group consisting of silicon nitride and silicon oxynitride and aluminum nitride.

References Cited by the Examiner

UNITED STATES PATENTS 2,618,565  11/1952  Nicholson _____ 106—55

OTHER REFERENCES

Mellor: Comprehensive Treatise on Inorganic and Theoretical Chemistry, vol. 5, page 883, 1924.

HELEN M. McCARTHY, *Acting Primary Examiner.*

TOBIAS E. LEVOW, *Examiner.*

J. POER, *Assistant Examiner.*